I. A. PALMER.
Wheel-Cultivator.
No. 46,383
Patented Feb. 14, 1865.
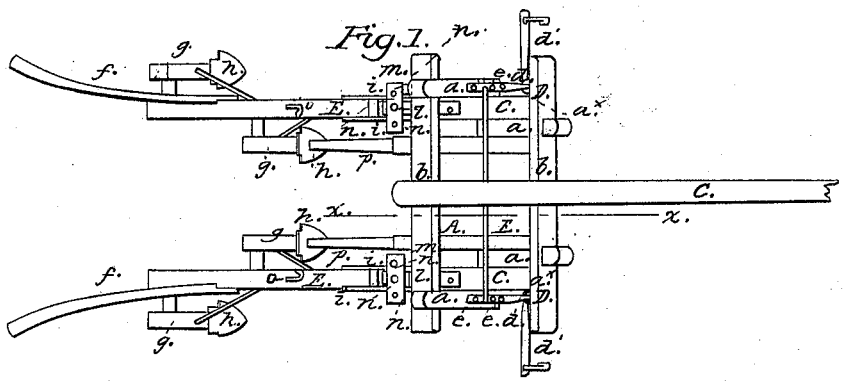
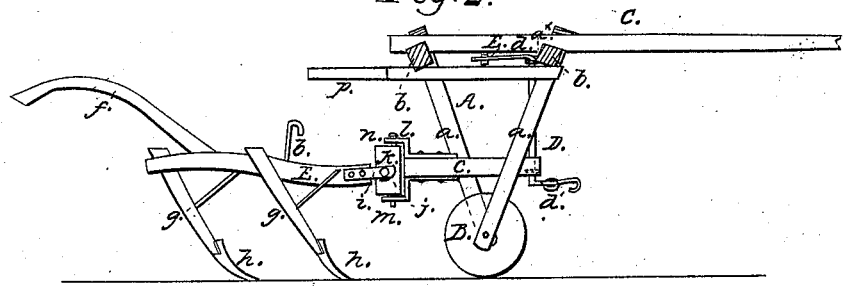
Witnesses:
Wm. Trewin
Theo. Tusch
Inventor:
Ira A. Palmer
per Munn & Co.
Attorneys

UNITED STATES PATENT OFFICE.

IRA A. PALMER, OF MONMOUTH, ILLINOIS.

IMPROVEMENT IN CULTIVATORS.

Specification forming part of Letters Patent No. 46,383, dated February 14, 1865.

*To all whom it may concern:*

Be it known that I, IRA A. PALMER, of Monmouth, in the county of Warren and State of Illinois, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a side sectional view of the same, taken in the line $x\, x$, Fig. 1.

Similar letters of reference indicate like parts.

This invention relates to a new and improved cultivator designed more especially for cultivating corn; and it consists in a novel manner of attaching the team to the implement, whereby the corn will not be liable to be bent down and broken by the whiffletrees and the draft of the two animals equalized.

The invention also consists in a novel way of attaching the plow-beams to the main frame of the machine, whereby the two beams may be set or adjusted at a greater or less distance apart, as may be desired, and allowed both a lateral and vertical movement, as hereinafter set forth.

A represents the main frame of the machine, which is constructed with two bars, $a\, a$, at each side, placed in V form and connected at their upper ends by transverse bars $b$, short bars $c$ being placed horizontally between the bars $a$ $a$ at each side of the main frame. This frame A is mounted on two wheels, B B, one at each side, and to the top of said frame the draft-pole C is secured.

D D are two vertical rods at the front part of the frame A, one at each side. These rods have their bearings $a^x$ attached to the front cross-bar, $b$, of the frame A and to the front parts of the bars $c$. The rods D are allowed to turn freely in their bearings, and they have arms at their upper and lower ends which are at right angles to each other, the upper arms, $d$, being perforated with a series of holes, $e$, in which the ends of a connecting-rod, E, are fitted, the whiffletrees being attached to the lower arms, $d'$. By this arrangement it will be seen that a simple and efficient draft-equalizing device is obtained, and one which will admit, if desired, of one horse having an advantage over the other by placing the ends of the rod E in different holes in the upper arms, $d$, of the rods C, so that a greater leverage power is given one arm, $d$. This may be necessary in many cases—as, for instance, where one horse has less strength than the other. Another advantage attending this arrangement consists in having the lower arms, $d'$, projecting outward from the bars $c$, whereby the whiffletrees are kept outward from the rows of corn, so that they cannot injure or break down the same as the implement is drawn along.

E E represent two plow-beams, which are provided with handles $f$, and have standards $g$ attached to them, to which plows $h$ are secured. The front ends of the plow-beams E E have each a metal plate, $i$, attached to each side of them, and these plates are perforated with holes to receive pins $j$, which pass through the holes in the plates $i$ and through any of a series of holes in vertical bars $k$, which work on pins or rods $l$ between horizontal plates $m$, attached to the rear of the bars $c$. These plates $m$ have a series of holes, $n$, made in them, through any of which the pins or rods $l$ may pass, the holes $n$ being in lines at right angles with the bars $c$, as shown clearly in Fig. 1. The bars $k$ are allowed to work freely on the pins or rods $l$, and hence it will be seen that the beams E and plows attached thereto may be moved or adjusted laterally and also vertically, and the beams also adjusted at a greater or less distance apart by placing the bars $k$ farther to the right or left between the plates $m$, and the plow-beams may be adjusted higher or lower by placing the pins $j$ in different holes in the bars $k$.

In transporting or moving the device from place to place the plows are kept elevated above the surface of the ground by placing hooks $o$, which are driven in the beams E over arms $p$, at the upper part of the main frame A.

Having thus described my invention, I claim as new and desire to secure by Letters Patent—

1. The draft-equalizer composed of the rods D D, provided with arms $d\, d'$ at their upper and lower ends, and placed at right angles to each other, with the lower arms projecting at right angles from the machine, with the upper arms, d, connected by a rod, E, and the whiffletrees attached to the lower arms, d', substantially as and for the purpose set forth.

2. Connecting the plow-beams E to the bars c of the main frame A through the medium of the bars k, which work on adjustable pins or rods l in plates m, attached to the bars c, and the pins j, which pass through the plates i, attached to the plow-beams, and through the bars k, all being arranged substantially as and for the purpose specified.

3. The particular manner of constructing the main frame A—to wit, of the side bars, a a, arranged in V form, connected at their upper ends by cross-bars b b, and mounted on wheels B, substantially as herein set forth.

IRA A. PALMER.

Witnesses:
GEO. W. SAVAGE,
JOHN PORTER.